3,311,147
PRELOADED NUT
Richard A. Walker, Warrington, Pa., assignor to Standard Pressed Steel Co., Jenkintown, Pa., a corporation of Pennsylvania
Filed May 20, 1966, Ser. No. 551,787
3 Claims. (Cl. 151—21)

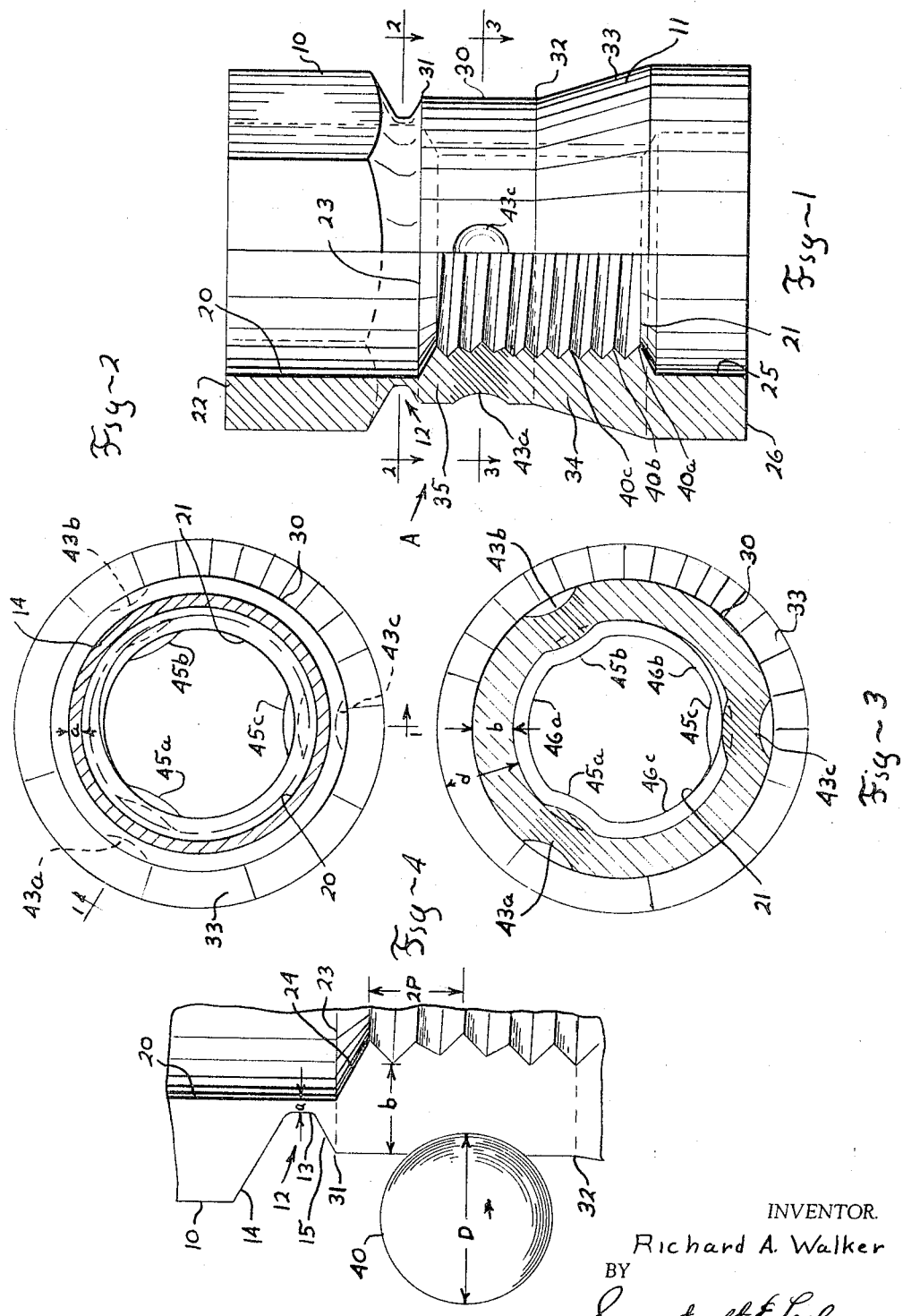

This invention is a continuation-in-part of my co-pending application Ser. No. 363,179 filed Apr. 21, 1964, now abandoned, and relates to "preloaded" or "twist-off" nuts, i.e., nuts having a driving section that is adapted to be sheared off at a breakneck or shear groove and separated from the nut body proper at a predetermined torque value and thereby provide for installing the nut under uniform loading conditions. Specifically, the invention relates to the placement or location of a novel prevailing torque type locking feature relative to the shear groove.

Heretofore, attempts have been made to provide twist off nuts with a locking feature by squeezing or ovalling the threads in the nut section to a non-circular configuration. However, no effect was made to precisely locate the lock with respect to other nut elements and as a result maximum performance could not be uniformly obtained. From the work done in connection with the development of the twist-off nut of this invention, the reasons for the lack of uniform high level performance have now become apparent. In some cases the nut configuration and the lock positioning was simply incapable of developing a high degree of locking torque; in others the nut configuration and the lock positioning was such that locking torque could not be maintained when the nut was subjected to sequential seating and removal operations in seated torque retention tests.

In some of the earlier efforts to apply locks to twist off nuts, the squeezing gave rise to highly objectionale conditions because the nut configuration was such that the ovalling or distortion could not be effectively confined to a specific location along the length of threading, or it was applied in such a way so that even the starting threads would be distorted and it frequently was impossible to start the nut. The application of the lock also frequently distorted the driving section so that driving tools could not be effectively employed. Attempts to solve the last mentioned problem by employing special breakneck configurations eliminated the distortion of the driving section but were unsuccessful in avoiding distortion of all the nut threads so that starting was still difficult.

By contouring the nut so as to provide a greater mass of material in the vicinity of the bearing face and starting threads than in the area to be squeezed, it was found possible to oval the threads in the thinner walled nut portions without objectionably distorting the starting threads. However, still other difficulties were encountered in that the locks so formed could not pass standard vibration tests for lock nuts, and the ovalling or distortion and even cracking in the snear groove or breakneck, thereby giving rise to non-uniform torquing values and preventing the use of the nut in applications where precision preloading was desired.

Some prior attempts to solve the foregoing problems involved the positioning of a heavy walled head axially between the starting threads and the breakneck and squeezing or otherwise distorting the head so as to oval the threads subtended thereby. Another attempted solution involved having a relatively thin walled lock locating section well inboard of the breakneck and employing a heavy head between the lock locating section and the breakneck so as to block the transmission of distortional forces to the breakneck and drive surfaces.

While the foregoing techniques represented advances over what had previously been done, nevertheless, they did not realize the criticality of precisely locating the lock with respect to other elements of the nut in order to obtain optimum performance.

Accordingly, it is an object of this invention to provide a twist off nut with a precisely located positive torque type locking feature that will pass standard vibration tests and seated torque retention tests, that will minimize to a non-objectionable degree the distortion in either the driving section, the starting threads or in the shear groove.

Other objects and advantages will appear in the ensuing description.

These objects are accomplished in accordance with this invention by providing a prevailing torque type lock nut assembly including a driving section, an internally threaded body section and a breakneck in the form of an external annular groove positioned between the driving and body sections wherein the driving section is adapted to be sheared off at the breakneck and separated from the body section under predetermined torque conditions, said nut body section having a cylindrical lock locating section of uniform wall thickness and of circular cross section aligned co-axially with the nut axis and extending toward the bearing face from the innermost edge of the breakneck groove, the wall thickness in said lock locating section being substantially greater than the minimum wall thickness of the breakneck and substantially less than the wall section portions surrounding the starting threads, said assembly having a counterbore in the driving section that is generally coaxial with the axis of the nut threads and slightly greater in diameter than major diameter of the nut threads, said counterbore extending from the outermost end of the driving section to a point within the nut body section inwardly of the breakneck and generally aligned with the end portion of the lock locating section immediately adjacent the breakneck, said lock locating section having a prevailing torque thread lock applied thereto, said lock being characterized in that the thread is inwardly distorted and the distortion is localized in small areas disposed symmetrically about the nut circumference and the primary distortion is localized and limited to the threaded portions that are about 1.5 thread pitches inwardly of the first full thread turn adjacent the breakneck.

The above and other features of this invention will be fully understood from the following detailed description and the accompanying drawings, in which:

FIGURE 1 is a sectional view of a nut made in accordance with this invention—the section being taken on line 1—1 of FIGURE 2.

FIGURE 2 is a plan view of the nut of FIGURE 1 along section line 2—2.

FIGURE 3 is a plan view of the nut of FIGURE 1 along section line 3—3.

FIGURE 4 is an enlarged detail showing the breakneck and locking feature of the nut assembly of FIGURE 1. It also serves to illustrate how the locking feature can be formed.

As shown in FIGURE 1, the nut assembly A includes a driving section 10 that is adapted to receive a tool that can impart rotational movement to the nut—e.g., a hex wrench can be used on the illustrated nut. The assembly also includes an internally threaded body section 11, and a breakneck 12. Twist-off nuts are well known in the art and any conventional type of breakneck can be employed that will shear evenly and break cleanly when a given predetermined torque is applied to the driving section 10. To this end, the breakneck as can be seen in FIGURE 4 is in the form of an external annular groove and has a short flat section 13 at the point of minimum wall thickness $a$. This will provide for a better dimensional control of the wall thickness at the shear groove than if the breackneck flanks 14, 15 are faired on an uninterrupted radius or meet at an angle. The flat 13 for most twist-off nuts need not be very long; for example, flats of from 0.005" to 0.010" have been found entirely satisfactory. The wall thickness $a$ in the general vicinity of the flat must be uniform, the section modulus and the mechanical properties of the material will determine the maximum torquing that can be applied to the driving section during installation.

The nut assembly A is provided with a counterbore 20 in the driving section. The counterbore is coaxially aligned with the axis of the nut threads 21. The counterbore 20 extends from the outermost end 22 of the driving section 10 to a point within the nut body section 23 that is slightly inward of the flat 13 of the breakneck immediately adjacent the lock locating section—i.e., preferably just enough beyond the breakneck flat so that the nut thread bore will not extend into the shear plane. This permits separation of the driving section without damaging the threads. A slight chamfer 24 can be provided at the intersection of the counterbore 20 and the tap hole thereby serving to further remove the threads from the shear plane. The counterbore 20 is of a diameter that is slightly greater than the major diameter of the nut threads as this will permit a bolt on which the nut is installed to extend into the driving section without making contact with the wall of the counterbore.

As is well known in the fastener art, it is also desirable to provide the nut section with a counterbore 25 at the bearing face 26. Counterbore 25 has a diameter slightly greater than the major diameter of the nut threads. This permits clearance of the bolt threads and the counterbore can also receive unthreaded body portions of the bolt so as to permit a given nut a bolt combination to be used to secure work pieces of slightly varying thicknesses—depending upon the depth of counterboring.

As can be seen in FIGURE 1, the nut body adjacent to the breakneck is a cylindrical surface of uniform circular cross section 30 and whose cylindrical axis is coaxial with the axis of the nut threads. The wall thickness $b$ in the lock locating section 30 is substantially greater than the wall thickness $a$ at the breakneck. This section is to facilitate the locating and forming of the locking feature and hereinafter is sometimes referred to as the lock locating section. As can be seen in FIGURES 1 and 4, the lock locating section extends from a point 31 that is the innermost edge of the breakneck groove and extends therefrom towards the nut bearing face to a point 32 intermediate the breakneck and bearing face. The lock locating section extending from point 31 to point 32 is a circular cylinder that surrounds at least the first three full turns (and any partially complete turn) of threading in the nut body immediately adjacent the breakneck and the innermost chamfered end of the counterbore 20. The lock locating section should not extend to a point where it will be the outer wall of the main load carrying or starting threads. To insure that the forming of the locking feature will not objectionably distort all the threads in the nut body section and particularly the starting threads 40a, 40b, and 40c nearest the bearing face 25, the cross sectional wall thickness $d$ or mass of material surrounding the threads where distortion is not wanted should be substantially greater than the cross sectional wall thickness $b$ in the lock locating section. This can be done for example, by the outward conical taper 33 from the end 32 of the lock locating section as shown in FIGURE 1.

To form the lock, certain threads are inwardly distorted in relatively small localized areas—preferably symmetrically disposed about the surface of the lock locating section—and precisely located with relation to the breakneck and threading. I have found that in order to locate the lock two conflicting effects must be taken into account namely the positioning as it affects locking torque when the nut is both seated and unseated. In order to maximize the ability of the lock to hold a high torque value when seated, it is necessary to position the lock distortion as high on the nut (i.e. as near the breakneck) as possible. However, in order to develop the maximum locking torque the primary distortion must be applied to threads that are as low on the nut (i.e., as near the bearing face) as possible.

If the distortion is applied to the first partial or full thread at the top of the nut, in order to maximize the torque holding capability when seated, there is a distinct danger of also distorting or cracking the breakneck and even distorting the driving flat; the actual removal torque developed at such a position is low and the nut will not withstand standard vibration tests. If the distortion is applied to the threads nearest the nut bearing face to maximize removal torque, the seated torque values will be unsatisfactory even if it is possible to start the nut.

Specifically, and in accordance with this invention, the primary distortion is to be localized and limited as closely as possible to the thread portions that are about 1.5 thread pitches inwardly of the first full turn of thread (50, FIGURE 4) adjacent the breakneck. If the primary distortion is applied the thread portions outside this localized area (either higher or lower) the disadvantages previously referred to will begin to appear promptly. When the lock is so positioned optimum performance can be obtained; the locking torque will be held at sufficiently high level to pass vibration tests and also to pass seated torque retention tests.

In addition to localizing the locking feature, relative to the breakneck, I have also found that improved results are obtained if the distortion is confined to relatively small areas about the circumference so as to form a plurality of individual locking points rather than ovalling the entire turn of thread. In this connection, the drawing shows the use of three symmetrically disposed lock distortions—any desired number can, however, be employed. The localized distortion of the lock locating section can be obtained by pressing it with small balls or deforming tools having a spherical bearing surface. For example, excellent results have been obtained by using three balls 40 that have a diameter D greater than 2 but less than 3 thread pitches and pressing them into the surface of the lock locating section to uniform depths 43a, 43b, 43c at points symmetrically disposed about the nut axis. The pressure employed should be such that it will distort the thread portions 45a, 45b and 45c generally lying beneath the ball and at the same time, limit and localize the distortion so that it extends axially over no more than about 2 thread pitches and generally the primary distortion can be localized to the thread portions covered by a single thread pitch. Considering a single turn of thread in plan there will be three limited and localized areas of distortion 45a, 45b and 45c, each being separated by undistorted thread portions (e.g., 46a, 46b and 46c) and the actual distortion extends over less than half the total thread circumference.

These twist off nuts can be installed in the same manner as twist off nuts now on the market and provided the locking feature is positioned and formed as described herein there will be no objectionable distortion and cracking in the breakneck therefore precision loading can be obtained with a very low order of variance with respect to the torque necessary for shearing, the distortion will not be transmitted to other critical areas such as the starting threads or the wrench engaging driving surfaces; and, the nut will pass the standard vibration test and seated torque retention tests for prevailing torque type lock nuts.

The twist off nuts were tested for resistance to vibration effects using equipment and procedures of National Aerospace Standards Committee Specification NAS 3350 (April 1963) except that the assemblies were not reseated or baked. The point drive bolt and nut were tightened onto the vibration fixture until the driving section of the nut separated. The assemblies were then vibrated for 30,000 cycles as described in the aforementioned NAS specification.

I claim:
1. In a prevailing torque type lock nut assembly including a driving section having tool engaging surfaces thereon, an internally threaded body section and a breakneck in the form of an external annular groove positioned between the driving and body sections wherein the driving section is adapted to be sheared off at the breakneck and separated from the body section under predetermined torque conditions, said nut body section having a cylindrical lock locating section of uniform wall thickness and of circular cross section aligned co-axially with the nut axis and extending toward the bearing face from the innermost edge of the breakneck groove, the wall thickness in said lock locating section being substantially greater than the minimum wall thickness of the breakneck and substantially less than the wall section portions surrounding the threads in the remaining portions of the body section, said assembly having a counterbore in the driving section that is generally coaxial with the axis of the nut threads and slightly greater in diameter than the major diameter of the nut threads, said counterbore extending from the outermost end of the driving section to a point within the nut body section inwardly of the breakneck and generally aligned with the end portion of the lock locating section immediately adjacent the breakneck, said lock locating section having a prevailing torque thread lock applied thereto, said lock being characterized in that the thread is radially inwardly distorted and the distortion is localized in small areas disposed symmetrically about the nut circumference and the primary distortion is localized and limited to the threaded portions that are at least 1.5 thread pitches inwardly of the first full thread turn adjacent the breakneck.

2. A locknut according to claim 1 wherein the thread distortion extends axially over no more than about two thread pitches.

3. A lock nut according to claim 1 wherein the distortion extends over less than half the total thread circumference.

References Cited by the Examiner
UNITED STATES PATENTS

| | | |
|---|---|---|
| 2,880,830 | 4/1959 | Rohe. |
| 2,940,495 | 6/1960 | Wing _____ 85—61 |
| 3,103,962 | 9/1963 | Neuschotz. |
| 3,174,385 | 3/1965 | Hollowell _____ 85—61 |

CARL W. TOMLIN, *Primary Examiner.*

R. S. BRITTS, *Assistant Examiner.*